US006678671B1

(12) United States Patent
Petrovic et al.

(10) Patent No.: US 6,678,671 B1
(45) Date of Patent: Jan. 13, 2004

(54) SYSTEM FOR LINKING A RESOURCE MANAGEMENT SYSTEM WITH AN EVENT OF A PROJECT IN A PROJECT MANAGEMENT SYSTEM AND A METHOD THEREFOR

(75) Inventors: Miomir Petrovic, Kanata (CA); Stephen Van Bruwaene, Nepean (CA)

(73) Assignee: Klocwork Solutions Corporation, Ontario (CA)

(*) Notice: Subject to any disclaimer, the term of this patent is extended or adjusted under 35 U.S.C. 154(b) by 138 days.

(21) Appl. No.: 09/703,589

(22) Filed: Nov. 2, 2000

(51) Int. Cl.[7] .............................................. G06F 17/30
(52) U.S. Cl. .............................. 707/1; 707/2; 707/100; 707/104.1
(58) Field of Search ...................... 705/8–11; 707/1–11, 707/100–104.1

(56) References Cited

U.S. PATENT DOCUMENTS

| | | | | |
|---|---|---|---|---|
| 5,765,140 A | * | 6/1998 | Knudson et al. ................ | 705/9 |
| 5,893,074 A | * | 4/1999 | Hughes et al. .................. | 705/8 |
| 6,049,776 A | * | 4/2000 | Donnelly et al. ............... | 705/8 |
| 6,101,481 A | * | 8/2000 | Miller ............................. | 705/9 |
| 6,275,812 B1 | * | 8/2001 | Haq et al. ...................... | 705/11 |
| 6,351,734 B1 | * | 2/2002 | Lautzenheiser et al. ........ | 705/8 |
| 2002/0107914 A1 | * | 8/2002 | Charisius et al. ............. | 709/203 |

OTHER PUBLICATIONS

C. Bertazzoni, F. Giannotti, "RASP: Resource Allocator for Software Projects", 1990, pp. 628–637.*

* cited by examiner

Primary Examiner—Greta Robinson
Assistant Examiner—Linh Black
(74) Attorney, Agent, or Firm—Sughrue Mion, PLLC

(57) ABSTRACT

The invention relates to a computer- or internet-based system and a method of integrating a resource management system with a project management system so that they share various resource data, namely, human resources, bookings of facilities, and expenses stored previously in a database. This invention particularly deals with a system and method of linking the resource data with each event of any given project contained within the project management system. Access means is provided whereby event-based access is provided to the resource management system for each event of a particular project, such that the resource data and desired functions of the resource management system are linked to any given event and can be managed directly from within the event. A Gantt chart graphically represents each project within the project management system and the events contained therein. All of this is achieved in a user-friendly manner by which the resource data relevant to a selected event can be viewed graphically on a computer screen in the form of a table or a Gantt-like chart.

16 Claims, 14 Drawing Sheets

Figure 4C

| Demo Project Costs | | | | | | | | | | | | |
|---|---|---|---|---|---|---|---|---|---|---|---|---|
| Show Details  Export Data | | | | | | | Legend: Plan Forecast Actual | | | | | |
| Staff | Aug 00 | Sep 00 | Oct 00 | Nov 00 | Dec 00 | Jan 01 | Feb 01 | Mar 01 | Apr 01 | May 01 | Jun 01 | Jul 01 |
| Staff Total ($) | 57.8 | 82.7 | 140.9 | 97.9 | 96.2 | 114.2 | 103.0 | 28.4 | 24.0 | 19.5 | 1.5 | 1.4 |
|  | 54.7 | 78.2 | 137.6 | 94.5 | 92.7 | 110.8 | 99.8 | 24.8 | 24.0 | 19.6 | 1.6 | 1.4 |
|  |  | | .3 | | | | | | | | | |
| Facilities | Aug 00 | Sep 00 | Oct 00 | Nov 00 | Dec 00 | Jan 01 | Feb 01 | Mar 01 | Apr 01 | May 01 | Jun 01 | Jul 01 |
| Facility Total ($) | .1 | 1.6 | 1.9 | 1.5 | 1.5 | 1.2 | .1 | | | | | |
|  | .3 | .6 | | .7 | .4 | | | | | | | |
|  |  | | .4 | .1 | | | | | | | | |
| Expenses | Aug 00 | Sep 00 | Oct 00 | Nov 00 | Dec 00 | Jan 01 | Feb 01 | Mar 01 | Apr 01 | May 01 | Jun 01 | Jul 01 |
| Expense Total ($) |  | 8.4 | 19.9 | 17.7 | 3.6 | 25.1 | 15.3 | | | | | |
| Grand Total ($) | 58.0 | 90.6 | 162.6 | 117.2 | 101.3 | 140.5 | 118.4 | 28.4 | 24.0 | 19.5 | 1.5 | 1.4 |
|  | 55.0 | 78.8 | 137.6 | 95.2 | 93.1 | 110.8 | 99.8 | 24.8 | 24.0 | 19.6 | 1.6 | 1.4 |
|  |  | | .3 | .4 | .1 | | | | | | | |

Figure 4J

SYSTEM FOR LINKING A RESOURCE MANAGEMENT SYSTEM WITH AN EVENT OF A PROJECT IN A PROJECT MANAGEMENT SYSTEM AND A METHOD THEREFOR

FIELD OF INVENTION

The present invention relates to a system and a method of integrating a resource management system with a project management system such that they share various resource data, namely, human resources, facilities, and expenses stored previously in a database.

BACKGROUND OF INVENTION

Project Management is an approach used to manage work within the constraints of time, cost and performance. The complex relationships between various competing resources, outcomes and client expectations that affect the performance and delivery of specified tasks require the application of methodologies particularly suited to the management of unique undertakings. The tasks might involve managing a plurality of technically complex projects, managing funding, and combining and managing the talents and time of hundreds of people. Project management has evolved to ensure that all such tasks are successfully completed in a most efficient and optimum manner.

Many systems available today tend to focus on either project management or resource management, but generally not both. As such, they tend to lack suitable functionality and flexibility. Although most project management systems work with resources, they do not usually provide a method of managing them independently—just through the project management system.

One such software-based project management tool is Microsoft Project™, which is a popular tool for managing a project. It provides a powerful environment for managing events within a project, with the ability to roll up events, indicate predecessors of events, calculate critical paths, reschedule events in order to optimize the project schedule, etc. It also allows people to be assigned to events, and in this way, provides limited resource management. The major functions and features of the software are namely to initiate, plan, execute, control, and report progress of projects where the emphasis is placed upon using the software to effectively create and manage project schedules using accepted project management principles. The database, where the resource information is stored, cannot be shared or manipulated by a plurality of projects.

The present invention addresses all of the above problems and presents a system and a method for enhancing an existing project management system (known as iC21), which has been developed within Nortel Networks and is a powerful tool for managing multiple projects that is used to manage events in a similar fashion to the prior art. The invention seeks to provide an enhanced computer-based project management system capable of linking resource data within a resource management system to events of a project contained in a project management system at the database level, thereby rendering the system significantly versatile and advantageous over prior art techniques.

SUMMARY OF INVENTION

The present invention, relates to a system and a method of enhancing the iC21 system by integrating the project and the resource management systems so that all the projects and resource management systems share the same resource data. The resource information is defined so that it can be:
  a. not attached to a project,
  b. attached to a project, or
  c. attached to an event within a project.

Accordingly, one aspect of the present invention provides a computer-based or internet-based integrated resource management system comprising: a project management system; a resource management system; a shared database linking the project management system and the resource management system, the shared database comprising resource data associated with a plurality of events associated with one or more projects; access means for providing event-based access to the resource management system for each event of a particular project, such that the resource data and desired functions of the resource management system may be linked to any given event and can be managed directly from within the event; and display means for displaying end-user information related to the use of the integrated resource management system.

Another aspect of the present invention provides in an improved computer-based or internet-based resource management system, a method of integrating a project management system and a resource management system, the method comprising the steps of: linking the project management system and the resource management system by a shared database which stores resource data associated with a plurality of events of one or more projects; and providing event-based access to the resource management system for each event of a particular project, such that the resource data and desired functions of the resource management system may be linked to any given event and can be managed directly from within the event.

The areas in which the system and method of the invention excel over the prior techniques reside in the amount of detail that can be attached to a resource assignment, and the types of resources that can be attached to an event. The prior systems only permit people to be attached to an event, with an associated percentage workload. Since the enhanced system of the invention attaches complete resource data information to an event, all details relating to projects, people, facilities and expenses are available, which is lacking in the prior art.

BRIEF DESCRIPTION OF THE DRAWINGS

The present invention will now be further described, by way of example, with reference to the accompanying drawings, in which:

FIG. 4A to FIG. 4J illustrate a series of display screen images relating to the flow of operation.

DETAILED DESCRIPTION OF THE INVENTION

Figure 1:
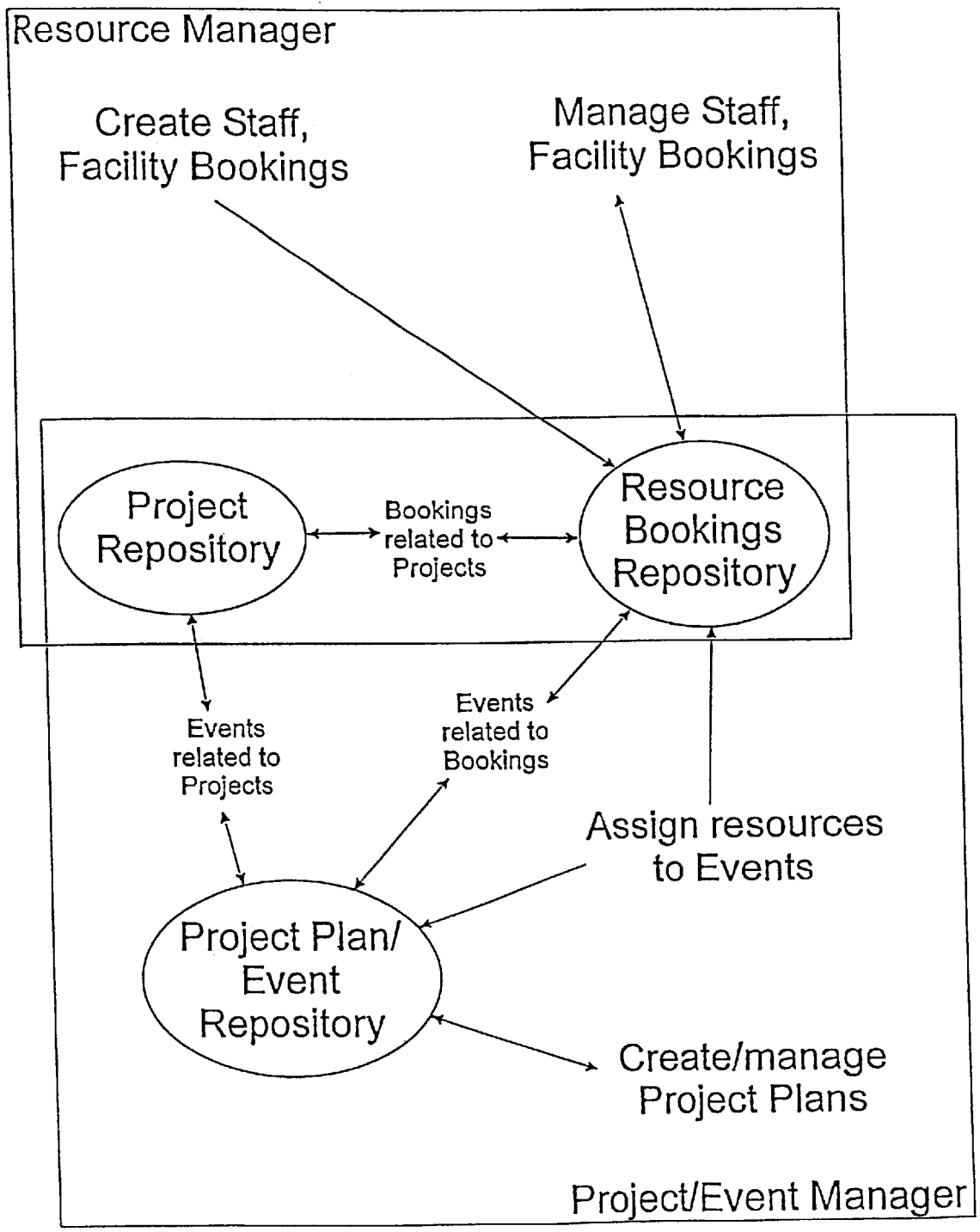
FIG. 1 illustrates a flow diagram showing the relationship between the project/event manager and the resource manager.

The project management system iC21 which is utilized in the present invention is a complete solution based on best business practices that includes roll-up events, predecessors, rudimentary critical path display and a rescheduling system that cascades changes to related items (rudimentary schedule optimization). The system is designed to integrate business processes and manage critical, high-value operations. It is ideal for service and knowledge-based businesses. Built on a modular, enterprise-scalable, distributed architecture, it is designed to satisfy any unique business needs that one may have.

The following terms will be defined below for the understanding of the user of the system.

Project User
  A person who is scheduled on projects and needs to update those projects;
Resource User
  A person who is given assignments and needs to report on what they have done;
Resource Manager
  A person who manages resources. This designation gives access to all the functionality within the "Resource Manager" folder;
Project Manager
  A person who manages projects. This designation gives access to all the functionality within the "Project Manager" folder;
Facility Manager
  A person who maintains facility records. This designation gives access to the "Resource Manager" folder and the Facility Repository;
System Administrator
  Someone who maintains the repositories and configures other portions of iC21. This designation gives access to all the functionality within the "Admin Manager" folder.

The Project Management System iC21 comprises the following basic modules:
 1. an Administration Manager module called Admin Manager, providing a centralized place for all system settings. It allows the user to configure iC21 according to individual requirements, thus delivering a personalized solution. It also contains repositories for staff, facilities and expenses and a user-based application and data security;
 2. a basic module called Program/Project Manager that allows for integration, prioritization, communication and continuous control of many projects across an enterprise. In addition, it provides the ability to accomplish enterprise wide strategic planning. Enterprise wide projects may be stored in the form of an Oracle™ database which in turn may be grouped under Program Manager. The ability to manage many projects by many people at various organizational levels is key for knowledge-intensive service organizations. The goal of the Project management system is to provide integrated product and service teams with executable plans and accurate performance data and give the manager sufficient lead time for solving potential problems and make better business decisions; and
 3. a resource management module called the resource manager that assists the user to deploy the right staff, facilities and expenses to the right projects at the right time. It simplifies staffing, scheduling, managing skills and developing organizational capabilities.

iC21 management system works on a client server system where all the users may be connected via Netscape or any other web browser.

The recommended Client Sysm is: 400 MHz or faster Pentium II-based PC, Microsoft Windows 95/98/NT4.0 or any system that supports Sun Java1.2.2, 10 MB of hard disk space and 128 MB of RAM.

The recommended Server system is: 600 MHz or faster Pentium II-based PC, Microsoft Windows NT4.0, 2 GB of hard disk space and two physical hard drives, 256 MB of RAM.

The URL address where the iC21 can be found may be provided by the system administrator. The initial set-up is also undertaken by the System Administrator.

The initial process involves configuring the iC21 project management system, defining lists and populating the repositories, which is the foundation of iC21. Once this has been done, the system is ready to be used and this configuring operation will not need to be executed again although updating the repositories is an ongoing process.

In order to activate a particular software module which is graphically displayed on a computer screen, generally the mouse pointer is placed on a particular display, such as an icon or an area of a graph, and then the left button of the mouse is depressed and released. This activity will be referred to herein as "clicking on", since this the most commonly used term in the art.

Defining the Lists
The lists are essential in providing the designations that are available for all resources within iC21. They must be defined before one can begin to populate the repositories. In general, the following items are available for editing:
  Band, Business Development Managers, Department, Employee Status, Employee Type, Facility Capability, Facility Capability Level, Functional Org, Line of Business, Location Path, Portal Box Colors, Position, Priority, Probability, Program Type, Staff Expertise, Staff Expertise Level, System Constants and Team Leader.

Populating the Repositories:
In the Staff Repository, the Project Manager will define the users of the system and enter data relating to staff who will be managed through iC21 Project Management System To begin populating the Staff Repository, the following steps should be followed:
 1. In the Admin Manager sub-menu, once the Staff Repository icon is clicked on, in the right frame, the Staff Repository screen opens.
 2. Next, the New button is clicked on.

The Employee Information screen appears in a new window. All the fields that are relevant are filled in and a user name and password are assigned to that staff member.
 3. The Insert button is clicked on.

This takes one to the Staff Record that has just been created and allows the user to add further information.

A similar process is repeated to continue to create Employee Records. The following terms are defined in connection with the Employee records.

Capacity Year
  indicates the number of working days in a particular year for a given employee.
Expertise
  indicates the employee's fields of expertise and level of proficiency in each as well as concentration expressed as a percentage of the employee's time.
LLC
  (Loaded Labour Cost) indicates the per day cost of the employee at a specific time period, this allows for an unlimited number of periods.
Role
  assigns the employee a role within the iC21 and a level of access.

To add further information about employees, these steps are followed:

1. In the Staff Repository screen, any employee record link is clicked on. The Employee Information screen appears in a new window.

On scrolling down to the bottom one will see these additional elements:

2. In the Employee Information screen, click on the Add New Capacity Year button. The Staff Capacity screen appears in a new window.

3. After entering the data the Insert button is clicked on. A screen appears with the message "Record Created Successfully".

To begin populating the Facility and Expense Repositories, similar steps for each respective repository are followed.

The Facility Repository houses information about labs, test equipment, meeting rooms and other resources that can be booked.

The Expense Repository houses information about the standard types of expenses that the accounting department uses.

Repositories may be updated by creating new staff, facilities or expenses or modifying existing resources. To find specific records, the Search utility may be used.

The present invention enhances an existing project management system (iC21) by integrating a resource management system contained therein, so that resource data such as facilities, staff and expenses, within the resource management system can be linked to events in the project management system thereby enhancing the project management system by adding functionality.

The advantages that the enhanced system achieves are namely, the ability to manage many projects, providing reports that span projects in the system and in its resource management system. In this respect, especially, it is far more powerful than the existing prior art systems. For example, where the prior systems have the ability to indicate which people are working on an event, the enhanced system of the invention goes much further by providing a complete resource management system for people, facilities and expenses, in which resource information for all projects is stored. Each of these resource data can be attached to an event and can be managed within a project. As a result, resources can be managed both within the context of a project as well as in a booking system independent of projects. This allows them to be shared by various projects and managed by both project and resource managers.

Referring now to FIG. 1, an embodiment of the invention is described in which the links between the project management system and the resource management system are illustrated. Within the project manager there resides a project plan/event repository. The resource repository and the project repository are shared between the project manager and the resource manager.

Each event in the project plan/event repository is attached to a project in the project repository. Events related to resources may be shared between resource bookings repository and the project plan/event repository. Events related to projects may be shared between project repository and project plan/event repository.

Figure 2:
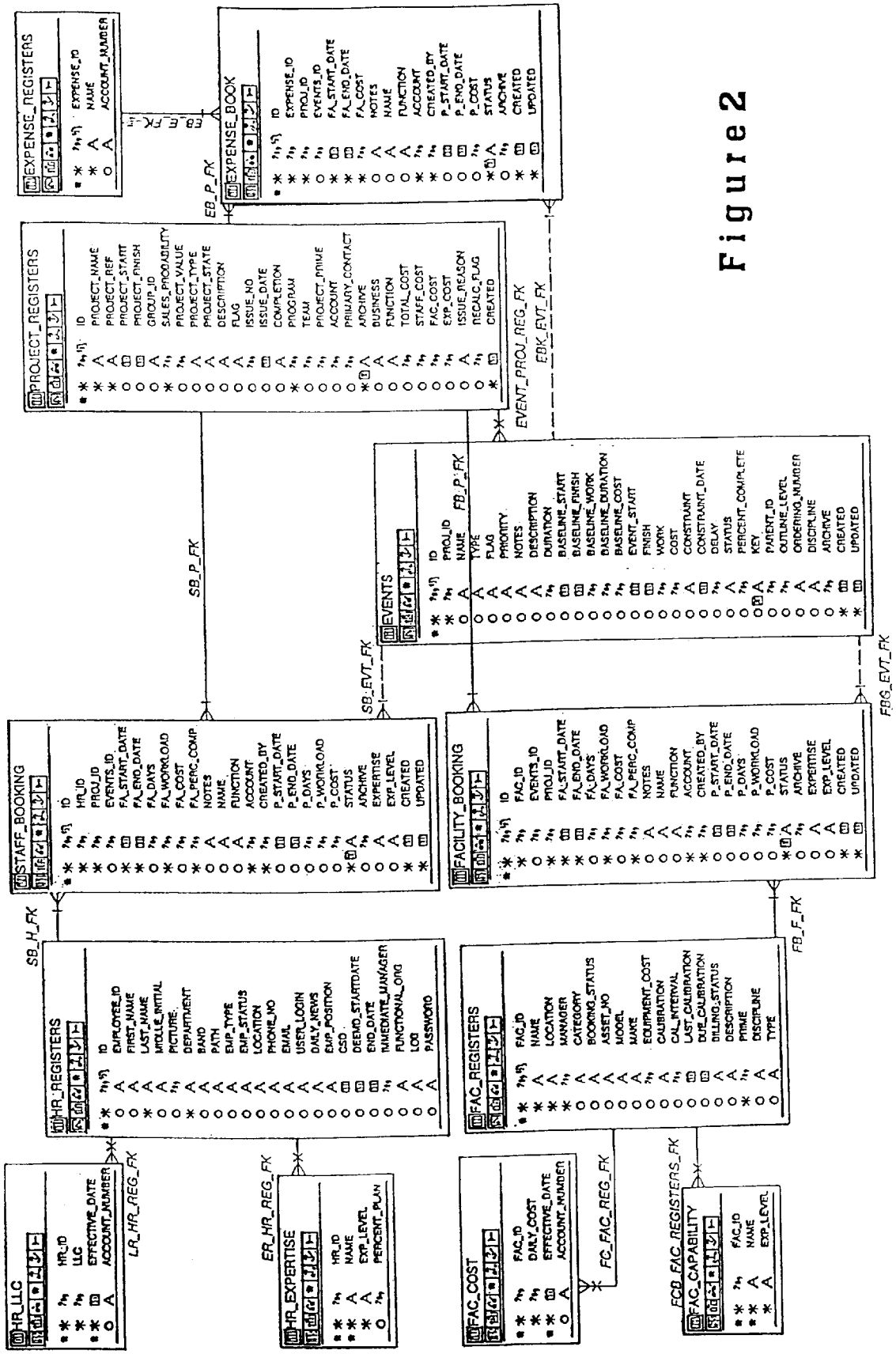
FIG. 2 illustrates a high level diagram showing all the links between the Project Repository and the various blocks of a Resource Management System of the present invention.

FIG. 2 shows the links between the various repositories in the database with all the fields and how each project is linked with resources comprising human resources, expenses and facilities is shown. For example: details for each project are obtained from the database under "Project_Registers" wherein various fields like ID, Project Name, Project start date, Project end date etc., are stored. This is linked with Staff Booking, Facility Booking and Expense Book. Once the user has finished populating the repositories, the system will be ready for use.

Figure 3:
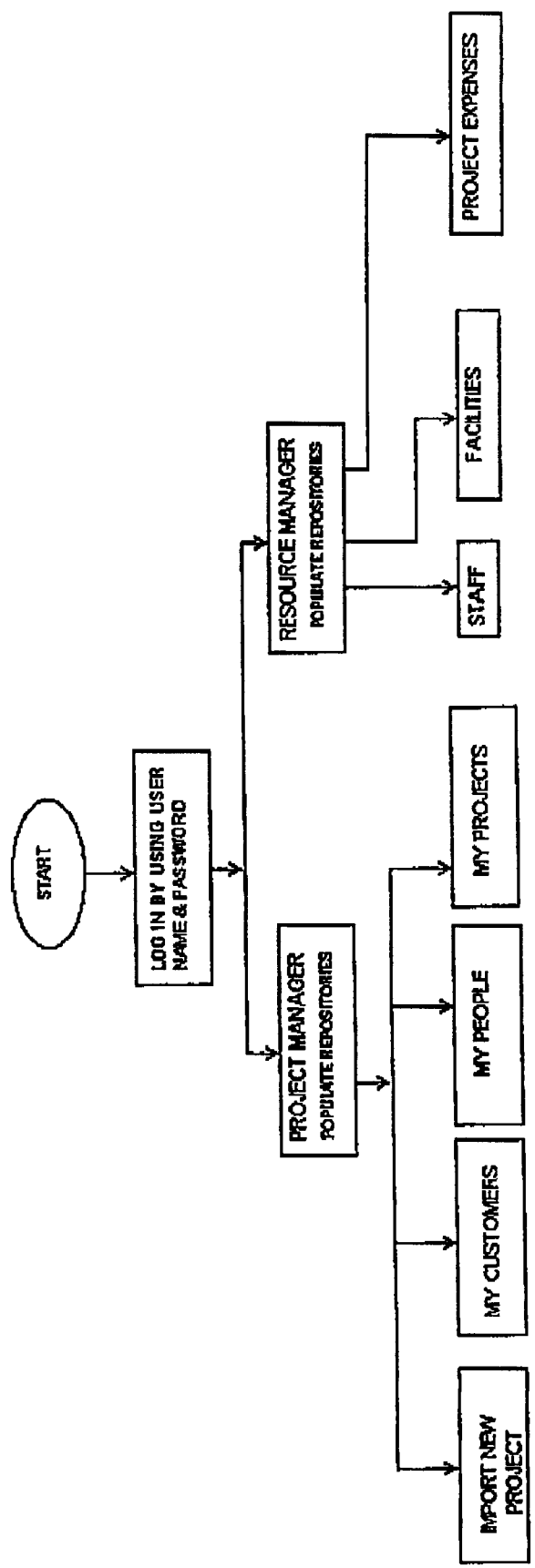
FIG. 3 is a flow chart describing the flow of operations when a resource data within the resource management system is assigned to an event of the project management system.
Figure 3:
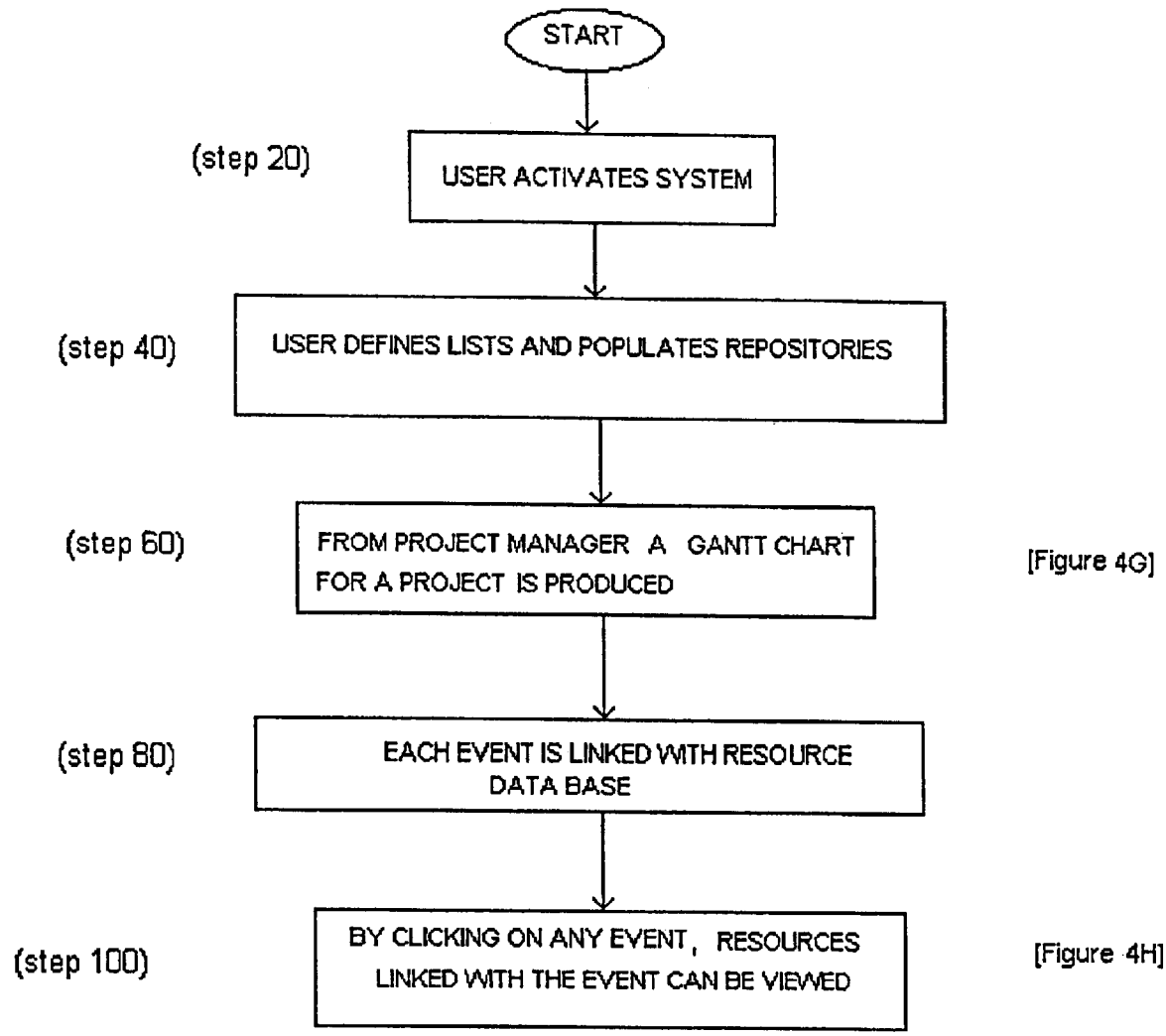

FIG. 3 shows a basic block diagram illustrating the resource information that is contained within the project manager and the resource manager software routines and the icons that can be viewed on a computer screen, once the system is activated by inputting proper user name and password. By clicking on any of the icons, relevant resource information may be viewed on a smaller window on the computer screen.

FIG. 3A shows the flow of operation illustrated using a basic block diagram. The user activates the system by typing in the user name and password (step 20). Next the lists will be defined and the repositories will be populated (step 40) by the user as explained above. The enhanced project management system of the invention produces a Gantt-like chart for each project which consists of all the events of a project (step 60). Each project is represented by a Gantt chart, which is a graphical representation of a project schedule that shows each task as a bar having a length proportional to the duration of the task. Each event is linked with the resources stored in a database (step 80). By clicking on any event on the Gantt chart booking of a resource assignment that is linked with the event can be viewed and can be changed (step 100).

Figure 4A:
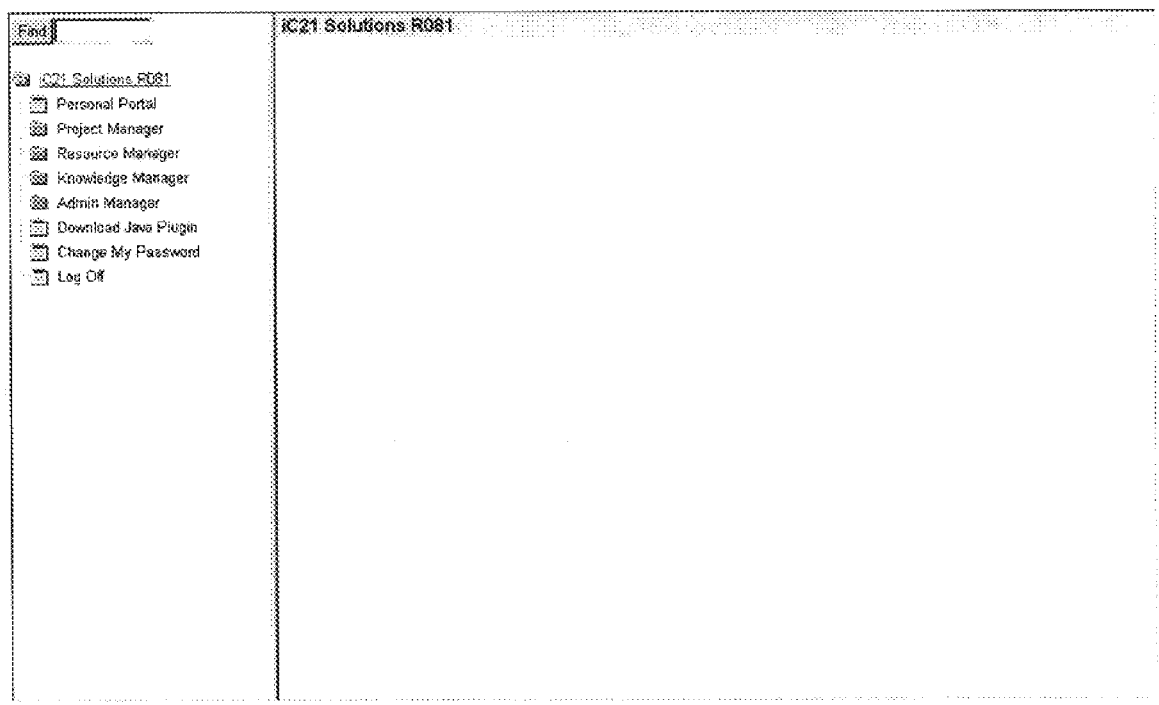
Figure 4B:
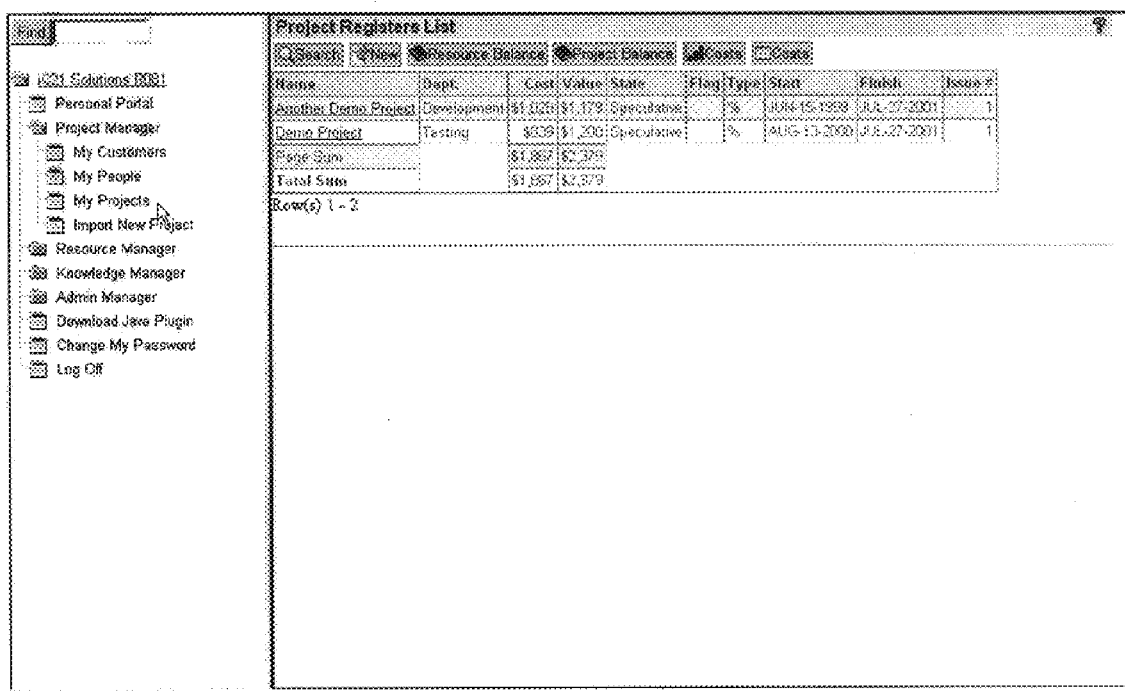

Once the system is activated from the access URL, and user name and password have been entered, the first screen appears which is the Main Menu as shown in FIG. 4A, wherein, the "Project Manager" and the "Resource Manager" folders are shown as icons on the screen. By clicking upon the "Project Manager" folder, four icons will be revealed (FIG. 4B), namely, "My People", "My Customers", "My Projects" and "Import New Project".

To start a new project, in the "Project Manager" folder, "My Projects" icon may be clicked upon. The "Project Registers List" screen opens in the right hand frame. When the "New" button is clicked, the "New Project Register" screen appears in a new window. The fields should be filled in accordingly, and then upon clicking on the "Create" button a new project is created (not shown in the figure). Each project is represented by a Gantt chart, graphically describing a project schedule that shows each task as a bar having a length proportional to the duration of the task.

Figure 4C:
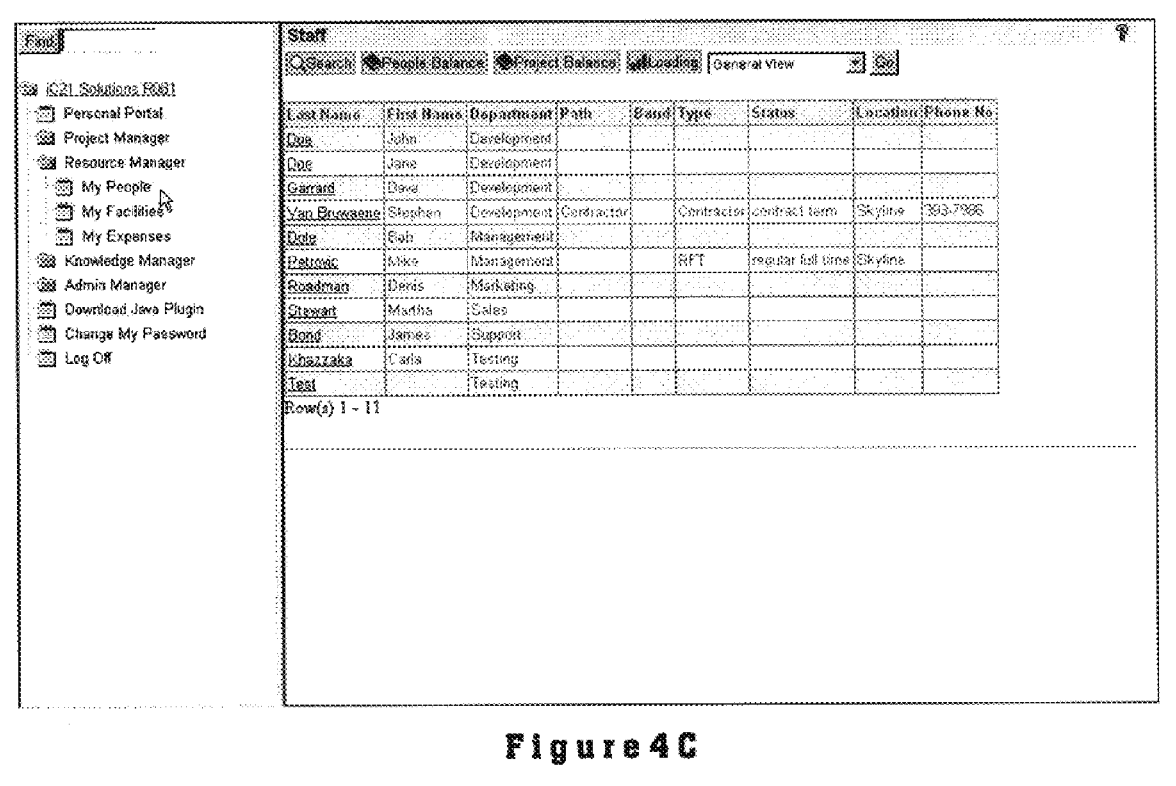

The Resource Management System is indicated by the icon "Resource Manager" folder. By clicking on this folder, three icons are revealed, namely: "My People", "My Facilities" and "My Expenses", as shown in FIG. 4C.

The flow of operations in the Resource Management System will now be described with the help of FIGS. shown in 4C to 4J. In the "Resource Manager" folder, clicking upon "My People" icon will invoke the next window "Staff" in the right hand frame, shown in FIG. 4C, where detailed information (e.g., Last name, First name, Department, Path, Band, Type, Status, Location and Phone Number) of each staff member may be viewed. On the top portion of this screen four icons appear; namely, "Search", "People Balance", "Project Balance" and "Loading".

Search screens are similar throughout the system. One can search on various fields, using the following constraints:

% Don't search on this field
= Field equals what's given
> Field is greater than what's given
>= Field is greater than or equal to what's given
< Field is less than what's given
<= Field is less than or equal to what's given
like Field is similar to what's given

|= Field is not equal to what's given null Field is null

Most screens have icons on the top portion of a screen, a list of which is supplied here below.

| | Buttons |
|---|---|
| | Print |
| | Save |
| | Add event |
| | Access knowledge library |
| | Change % complete |
| | Drag & drop entries |
| | Change start and end dates for entries |
| | Create entry links |
| | Show or hide annotations |
| | Enable or disable grid |
| | Expand all folders |
| | Collapse all folders |
| | Add capability |
| | Add expertise |

Figure 4D:
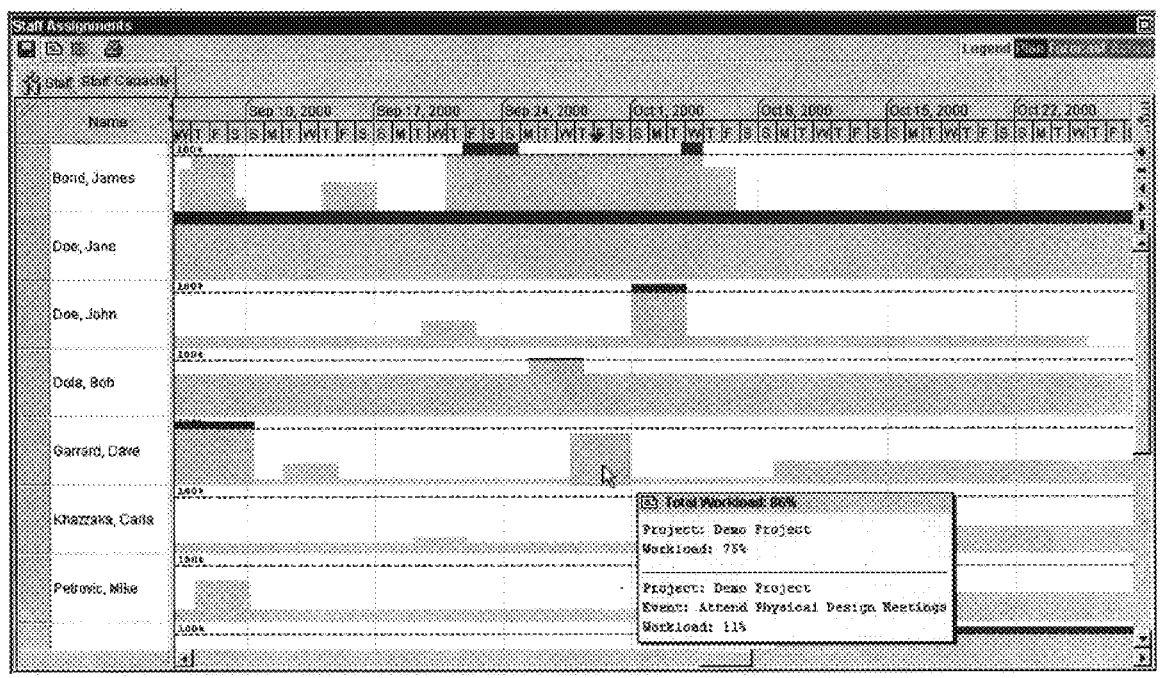
Figure 4E:
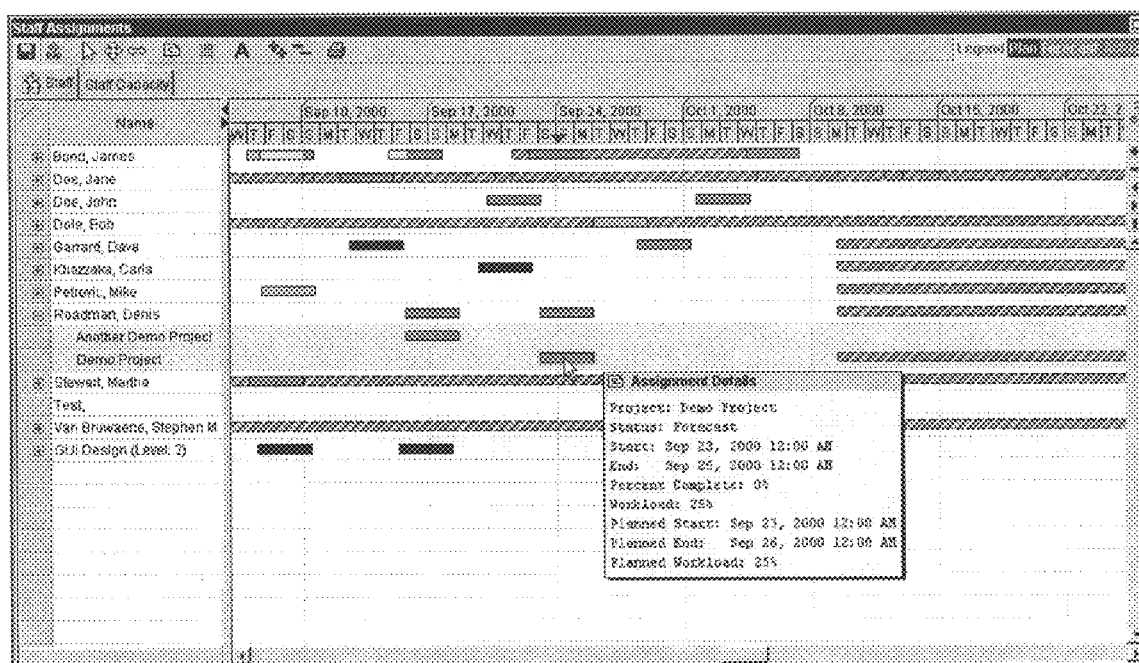

By clicking on the "People Balance" icon, the "Staff Assignments" screen appears in a new window, shown in FIG. 4E. In this Gantt chart, an Assignment detail of any project may be viewed against the names of the individual staff members. Three different colours indicate Plan, Forecast and Actual bookings. Some parts of the chart may be indicated by hashed lines, which means these bookings are related to an event in the project management system. By clicking upon any area of the chart, information such as the name of the project, status, start and end date, percentage completed, workload in percentage, etc. maybe viewed in a smaller screen.

In the "Staff Assignments", by clicking on the "Staff Capacity" tab, the next window shown in FIG. 4D appears, where one can see which people are working on which assignments as well as the status of their work. For each individual staff member a capacity chart is produced which shows the usage of a person over time, and upon clicking any area of the chart, information such as which project the individual is working on and workload in percentage and the Event associated with the project and the workload in percentage is displayed in a small screen along with the total workload.

Figure 4F:
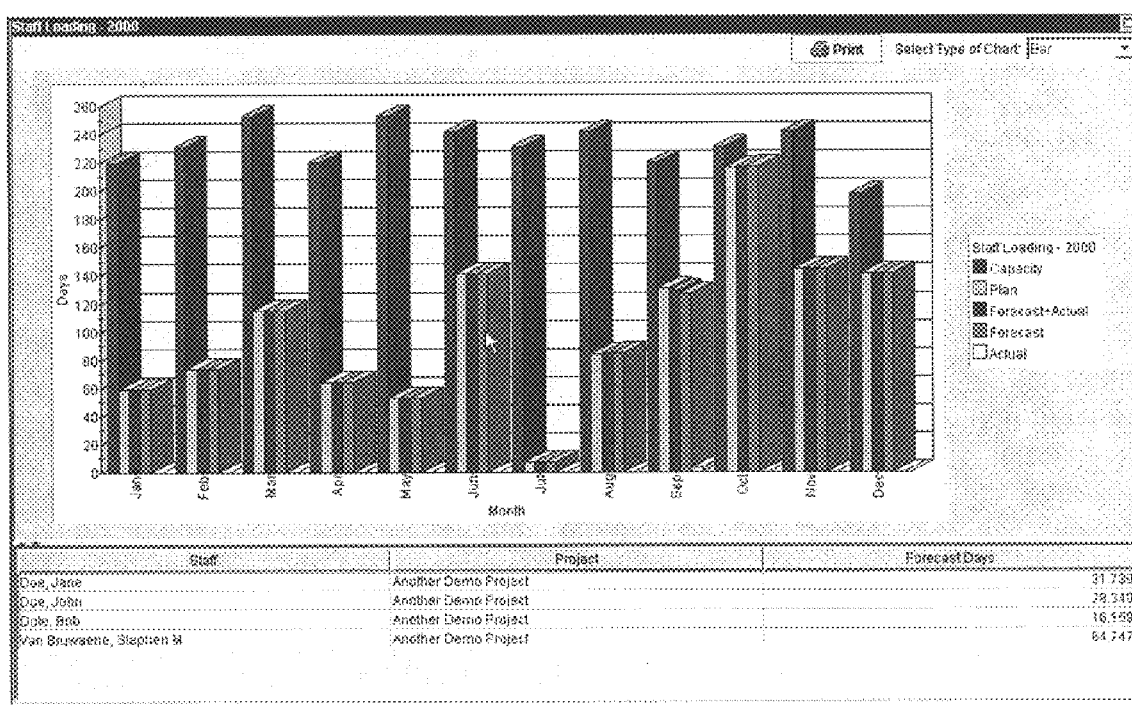

By clicking on "Loading" button, the capacity of the staff against Plan, Forecast and Actual Usage may be seen with respect to months and days as shown in FIG. 4F. By clicking on a data point on the graph, the underlying data can be viewed.

Figure 4G:
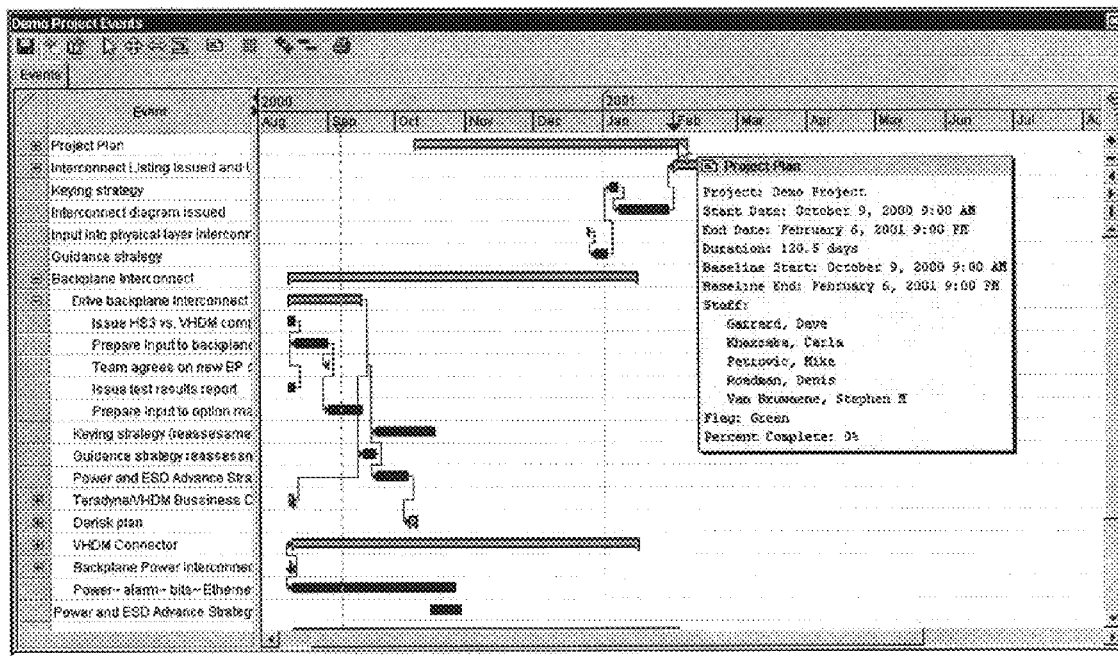

The next screen is shown by FIG. 4G, where each event of a selected project plan can be viewed by a bar against start date and end date. By selecting the annotation and then by placing the mouse pointer on any area of a bar, information such as the name of the project, start date and time, end date and time, duration, baseline start, baseline end, names of staff members involved, percentage completed may be viewed in a smaller screen. Furthermore, these values can be altered or edited by selecting the event and by selecting the area and by dragging the mouse pointer as desired.

Figure 4H:
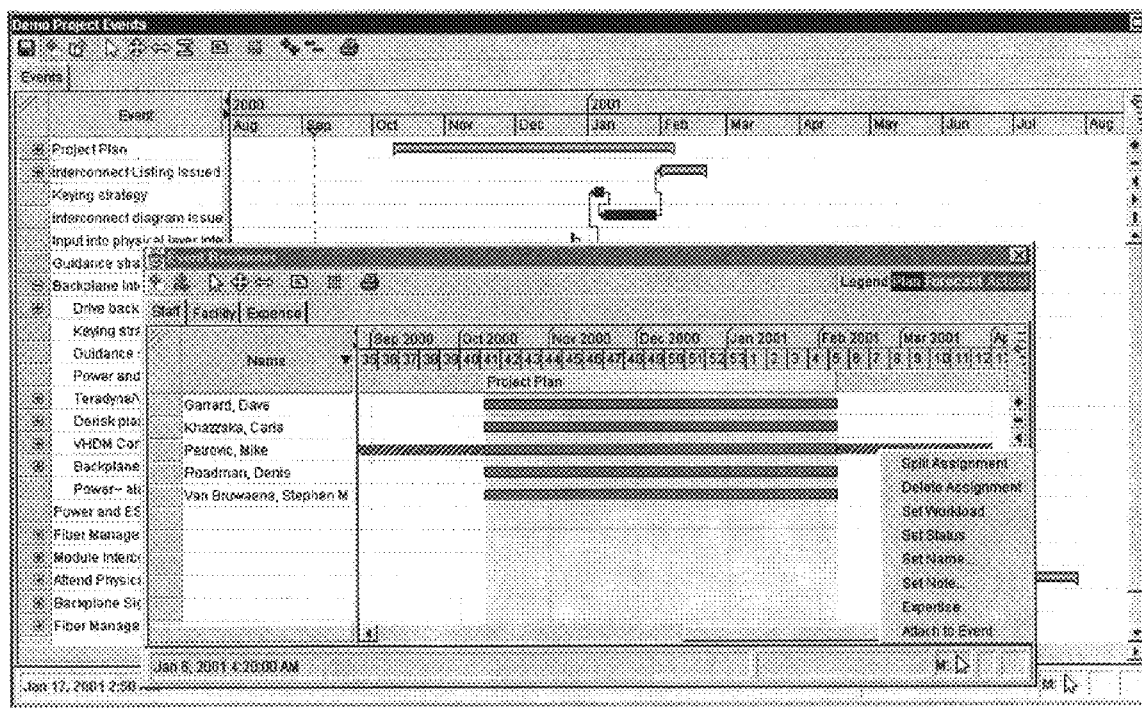
Figure 41:
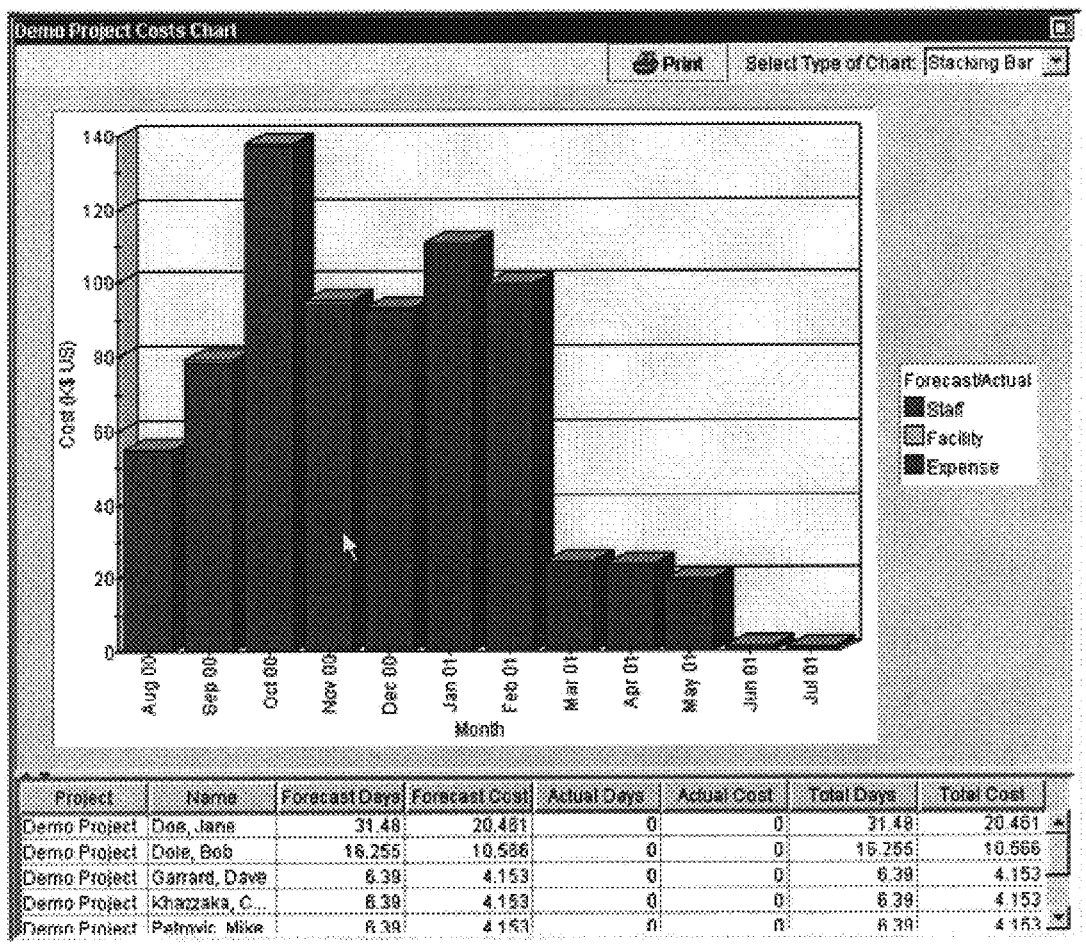

The next screen is shown by FIG. 4H, where by right-clicking on the appropriate event and scheduling event resources, resources may be viewed and altered. This screen comprises a Gantt-like chart having a specific relationship to the Gantt chart produced earlier. This relationship will be explained below with respect to the resource management system.

The costs for booking staff, facilities and expenses are automatically calculated based upon the selection. As the selection is changed or altered in any way, the cost for the project is also changed. This can be viewed in bar graph form or a chart form as shown in FIG. 4I and FIG. 4J.

In the project manager, the system software loads all the events into the Gantt chart from the database table contained in the database; searches for the booking tables in the database to find all the bookings that are related to the events in the Gantt chart, and then loads them into the memory using the Gantt software routine. When the user wishes to create a new resource data related to an event, the software creates this data in memory, with appropriate information to represent the relationship, and saves this new information back to the database.

Every event in the Gantt chart is represented as an event object in the database. The resource management system consists of a plurality of staff assignments, facility bookings, and expenses that can be represented and displayed on the computer screen as a Gantt-like chart with bars thereon. On the Gantt-like chart, the bars represent a plurality of assignments, facility bookings and expenses. Each staff assignment, facility booking and expense is represented as a resource object in the database. The resource objects in the database have an event attribute representing the event object the booking object is related to. The event attributes contained in the resource objects are used by the program/project manager software routine to determine which resource objects are related to the events in the corresponding Gantt chart. The event attributes contained in the resource objects are used by the resource management software routine to determine which event objects are related to the bookings in the corresponding Gantt-like chart.

Thus, the present invention provides a system and method of integrating a resource management system with an existing project management system, so that the resource data such as, facility, staff and expenses within the resource management system can be linked to events in the project management system thereby enhancing the project management system by adding functionality. As a result, a resource manager has the ability to manage all resources at the database level, including those that are related to events.

What is claimed is:

1. A computer-based or internet-based integrated management system comprising:

a project management system;

a resource management system;

a shared database linking the project management system and the resource management system, the shared database comprising resource data associated with a plurality of events associated with one or more projects;

access means for providing event-based access to the resource management system for each event of a particular project, such that the resource data and desired functions of the resource management system may be linked to any given event and can be managed directly from within the event; and display means for displaying end-user information related to the use of the integrated resource management system;

wherein the resource data contains information with respect to staff, facility, and expense, and wherein the resource data can be represented and displayed on the display means as a Gantt-like chart;

wherein each staff, facility and expense is represented as a resource object in the database; and wherein the resource objects in the database each have an event attribute representing the event to which the resource object is related.

2. The system as claimed in claim 1, wherein the event attributes contained in the resource objects are used by the project management system to determine which resource objects are related to the events in the corresponding Gantt chart.

3. The system as claimed in claim 1, wherein the event attributes contained in the resource objects are used by the resource management system to determine which event objects are related to the resources in the corresponding Gantt-like chart.

4. A computer-based or internet-based integrated management system comprising:
   a project management system;
   a resource management system;
   a shared database linking the project management system and the resource management system, the shared database comprising resource data associated with a plurality of events associated with one or more projects;
   access means for providing event-based access to the resource management system for each event of a particular project, such that the resource data and desired functions of the resource management system may be linked to any given event and can be managed directly from within the event; and
   display means for displaying end-user information related to the use of the integrated resource management system;
   wherein the project management system comprises:
      project selection means for selecting a project from a plurality of projects contained in the project management system;
      activation means for activating the project management system to create a Gantt chart representing the plurality of events of a selected project, indicating a start date and an end date of the projects and the events; and
      event selection means for selecting and activating an event of the selected project by clicking upon an area represented by the event;
      wherein the plurality of events of the selected project are graphically shown on the Gantt chart that represents the selected project.

5. A computer-based or internet-based integrated management system comprising:
   a project management system;
   a resource management system;
   a shared database linking the project management system and the resource management system, the shared database comprising resource data associated with a plurality of events associated with one or more projects;
   access means for providing event-based access to the resource management system for each event of a particular project, such that the resource data and desired functions of the resource management system may be linked to any given event and can be managed directly from within the event; and
   display means for displaying end-user information related to the use of the integrated resource management system;
   wherein the shared database containing the resource data information is stored in computer memory;
   wherein the resource data contains information with respect to staff, facility, and expense, and
   wherein the resource data can be represented and displayed on the display means as a Gantt-like chart;
   wherein each staff, facility and expense is represented as a resource object in the database; and
   wherein the resource objects in the database each have an event attribute representing the event to which the resource object is related.

6. The system as claimed in claim 1 wherein the access means provides both event-based access and traditional access from the resource management system itself, such that the resource data can be managed directly from within an event or can be managed external to the event.

7. The system as claimed in claim 1 wherein the access means additionally provides project-based access, such that the resource data can be managed directly from within the event or can be managed external to the event in the context of a particular one of a plurality of projects.

8. The system as claimed in claim 1 wherein the project or projects can be graphically represented and displayed on the display means as a Gantt chart, and wherein each bar on the Gantt chart represents an event contained in a particular project.

9. The system as claimed in claim 8 wherein every event in the Gantt chart is represented as an event object in the database.

10. In an improved computer-based or internet-based management system, a method of integrating a project management system and a resource management system, the method comprising the steps of:
   a) linking the project management system and the resource management system by a shared database which stores resource data associated with a plurality of events of one or more projects; and
   b) providing event-based access to the resource management system for each event of a particular project, such that the resource data and desired functions of the resource management system may be linked to any given event and can be managed directly from within the event; and
   further comprising the steps of:
      activating the improved management system by inputting an appropriate user name and password;
      initializing the improved management system by configuring the improved management system, defining lists and populating repositories, the repositories being stored in the shared database;
      invoking the improved management system and thereby displaying icons on a display means, the icons representing projects, human resources, facility resources and project expenses.

11. In an improved computer-based or internet-based management system, a method of integrating a project management system and a resource management system, the method comprising the steps of:
   a) linking the project management system and the resource management system by a shared database which stores resource data associated with a plurality of events of one or more projects; and
   b) providing event-based access to the resource management system for each event of a particular project, such that the resource data and desired functions of the resource management system may be linked to any given event and can be managed directly from within the event; and further comprising the steps of:
activating the improved management system by inputting an appropriate user name and password;
initializing the improved management system by configuring the improved management system, defining lists and populating repositories, the repositories being stored in the shared database;
invoking the improved management system and thereby displaying icons on a display means, the icons representing projects, human resources, facility resources and project expenses; and further comprising the step of:
selecting the event on the Gantt chart of the selected project in the project management system and altering the values in the corresponding human resources, facility resources or expense book.

12. The method of claim 10, wherein said step of populating the repositories includes the substeps of:
populating a resource booking repository containing a staff repository, a facility repository and an expense repository by inputting resource data in the database stored in the memory of the computer; and
populating a project repository by inputting project information data in the database.

13. The method of claim 11, further comprising the steps of:
searching for the resource data in the database to find all the resource data that are related to the events in the Gantt chart and loading tables into the memory using a Gantt software routine by clicking on an area on the Gantt chart indicating the event;
reviewing tables generated thereby showing existing resource data from the database;
creating a new resource data related to an event in the memory, containing information for representing a relationship;
altering the corresponding resource data; and
saving the new information back into the resource data in the database.

14. The method of claim 10, wherein said step of invoking the resource management system comprises the steps of:
linking human resources information contained within the shared database with the selected event in the project by clicking on an icon representing the human resources information;
linking facility resources information contained within the database, with the selected event in the project by clicking on an icon representing the facility resources; and
linking project expense book information contained within the database, with the selected event in the project by clicking on an icon representing the project expense book; wherein the resource data linked with to an event can be viewed or altered.

15. The method of claim 10 wherein the step of providing access provides both event-based access and traditional access from the resource management system itself, such that the resource data can be managed directly from within the event or can be managed external to the event.

16. The method of claim 10 wherein the step of providing access further includes the substep of additionally providing project-based access, such that the resource data can be managed directly from within the event or can be managed external to the event in the context of the project.

* * * * *